(12) United States Patent
Mossige et al.

(10) Patent No.: US 12,055,421 B2
(45) Date of Patent: Aug. 6, 2024

(54) METHODS OF DETERMINING CLOGGING AND CLOGGING CHARACTERISTICS OF COATING MEDIUM APPARATUS, COATING MEDIUM APPARATUS, CALIBRATION SYSTEM AND INDUSTRIAL ROBOT

(71) Applicant: ABB Schweiz AG, Baden (CH)

(72) Inventors: Morten Mossige, Nærbø (NO); Øyvind Landsnes, Mandal (NO); Aravindhan Gunaselvam Kasthuri Thilagam, Chennai (IN); Andreas Skaar, Bryne (NO); Yngve Finnestad, Sandnes (NO)

(73) Assignee: ABB Schweiz AG, Baden (CH)

( * ) Notice: Subject to any disclaimer, the term of this patent is extended or adjusted under 35 U.S.C. 154(b) by 229 days.

(21) Appl. No.: 17/753,258

(22) PCT Filed: Sep. 10, 2019

(86) PCT No.: PCT/EP2019/074017
§ 371 (c)(1),
(2) Date: Feb. 25, 2022

(87) PCT Pub. No.: WO2021/047753
PCT Pub. Date: Mar. 18, 2021

(65) Prior Publication Data
US 2022/0364892 A1    Nov. 17, 2022

(51) Int. Cl.
*G01F 1/34*          (2006.01)
*B05B 13/04*         (2006.01)
(Continued)

(52) U.S. Cl.
CPC ................ *G01F 1/34* (2013.01); *B05B 15/50* (2018.02); *B25J 11/0075* (2013.01);
(Continued)

(58) Field of Classification Search
CPC ......... G01F 1/34; B05B 15/50; B05B 12/004; B05B 3/1092; B05B 13/0452; B25J 11/0075
See application file for complete search history.

(56) References Cited

U.S. PATENT DOCUMENTS

2008/0183366 A1    7/2008  Bauerle
2009/0220703 A1    9/2009  Whr et al.
(Continued)

FOREIGN PATENT DOCUMENTS

JP    08155347 A      6/1996
JP    2005344467 A   12/2005
(Continued)

OTHER PUBLICATIONS

International Preliminary Search Report; Application No. PCT/EP2019/074017; Completed: Mar. 15, 2022; 9 Pages.
(Continued)

*Primary Examiner* — Peter J Macchiarolo
*Assistant Examiner* — John M Royston
(74) *Attorney, Agent, or Firm* — Whitmyer IP Group LLC

(57) ABSTRACT

A method of determining a degree of clogging of discharge holes of an apparatus for applying a coating medium to an object, the method including conducting air through the discharge holes; determining an output air pressure between an air flow regulator of the apparatus and the discharge holes, the air flow regulator being arranged to regulate a flow of the air; and determining a degree of clogging of the discharge holes based on the output air pressure. An apparatus for applying a coating medium to an object, a calibration system including an apparatus and a blocking device, an industrial robot including an apparatus, and a method of determining clogging characteristics of an apparatus, are also provided.

15 Claims, 3 Drawing Sheets

(51) Int. Cl.
    *B05B 15/50*     (2018.01)
    *B25J 11/00*     (2006.01)
    *B05B 3/10*     (2006.01)
    *B05B 12/00*     (2018.01)

(52) U.S. Cl.
    CPC ........... *B05B 3/1092* (2013.01); *B05B 12/004* (2013.01); *B05B 13/0452* (2013.01)

(56) References Cited

U.S. PATENT DOCUMENTS

| | | |
|---|---|---|
| 2012/0180723 A1 | 7/2012 | Gummlich et al. |
| 2015/0275442 A1 | 10/2015 | Heusinger et al. |
| 2016/0030962 A1 | 2/2016 | Sinnott et al. |
| 2018/0283019 A1 | 10/2018 | Telleria et al. |
| 2019/0093373 A1* | 3/2019 | Telleria ................... B05B 12/18 |
| 2019/0358660 A1* | 11/2019 | Paralikar ............. A01M 7/0014 |
| 2021/0387213 A1* | 12/2021 | Medina ................. B05B 5/0426 |
| 2022/0184646 A1* | 6/2022 | Yoshida ................ B05B 5/0426 |

FOREIGN PATENT DOCUMENTS

| | | | |
|---|---|---|---|
| JP | 2006007136 A | * | 1/2006 |
| JP | 2007066650 A | | 3/2007 |
| JP | 2007101073 A | | 4/2007 |
| JP | 2013035027 A | | 2/2013 |
| JP | 6094167 B2 | | 3/2017 |
| KR | 1020090077882 A | | 7/2009 |
| WO | 2006132215 A1 | | 12/2006 |
| WO | 2011125855 A1 | | 10/2011 |

OTHER PUBLICATIONS

Chinese First Office Action and Search Report; Application No. 2019800999613; Completed: Nov. 11, 2022; 15 Pages.
Chinese Office Action; Application No. 2019800999613; Issued: Sep. 5, 2023; 18 Pages.
Japanese Office Action; Application No. 2022-514583; Completed: Mar. 31, 2023; Mailing Date: Apr. 4, 2023; 11 Pages.
International Search Report and Written Opinion of the International Searching Authority; Application No. PCT/EP2019/074017; Completed: May 18, 2020; Mailing Date: Jun. 2, 2020; 15 Pages.
European Office Action; Aopplication No. 19768756.9; Completed Apr. 19, 2024; 10 Pages.

\* cited by examiner

METHODS OF DETERMINING CLOGGING AND CLOGGING CHARACTERISTICS OF COATING MEDIUM APPARATUS, COATING MEDIUM APPARATUS, CALIBRATION SYSTEM AND INDUSTRIAL ROBOT

TECHNICAL FIELD

The present disclosure generally relates to apparatuses for applying a coating medium to an object. In particular, a method of determining a degree of clogging of discharge holes of an apparatus for applying a coating medium to an object, an apparatus for applying a coating medium to an object, a calibration system comprising the apparatus and a blocking device, an industrial robot comprising the apparatus, and a method of determining clogging characteristics of an apparatus for applying a coating medium to an object, are provided.

BACKGROUND

In order to apply a coating medium to an object, such as the application of paint to a motor vehicle body part, the coating medium may be atomized by a rotary bell atomizer and applied to the object by means of shaping air and electrostatic charging of the coating medium. Various types of liquid-based coating mediums, such as paint or varnish, may be applied to an object in this way. A controlled and uniform shaping air flow is important to obtain a stable and good application of the coating medium.

In a bell atomizer, the shaping air is typically dispensed through a plurality of discharge holes in a shaping air ring. If these discharge holes start to be clogged, e.g. by paint particles, the coating medium application performance will be deteriorated. Traditional ways of dealing with this problem is by manual inspection and/or by excessive use of solvent during cleaning to be on the "safe side".

US 2016030962 A1 discloses a method of monitoring a rotary paint atomizer. The method includes determining a target rotational speed, a target air flow rate, a target torque, and a target electrostatic current, and measuring an operating rotational speed, an operating air flow rate, an operating torque, and an operating electrostatic current. The method includes detecting at least one of a first condition in which the operating rotational speed differs from the target rotational speed, a second condition in which the operating air flow rate differs from the target air flow rate, a third condition in which the operating torque differs from the target torque, and a fourth condition in which the operating electrostatic current differs from the target electrostatic current.

In order to detect clogging of discharge holes of a bell atomizer, curves describing a relationship between shaping air flow and required output air pressure to achieve that flow may be used to see a deviation between a calibrated curve and a dynamic curve and issue a warning about possible issues with shaping air, including clogging. However, this method is a crude method and does not allow a small amount of clogging to be detected. Furthermore, this method does not distinguish between clogging, and e.g. a temporarily pinched hose.

SUMMARY

One object of the present disclosure is to provide an accurate, simple and/or cost-effective method of determining a degree of clogging of discharge holes of an apparatus for applying a coating medium to an object.

A further object of the present disclosure is to provide a method of determining a degree of clogging of discharge holes of an apparatus for applying a coating medium to an object, which method allows low levels of clogging to be detected.

A still further object of the present disclosure is to provide a method of determining a degree of clogging of discharge holes of an apparatus for applying a coating medium to an object, which method solves several or all the foregoing objects in combination.

A still further object of the present disclosure is to provide a method of determining a degree of clogging of discharge holes of an apparatus for applying a coating medium to an object, which method can distinguish between clogging and a passing anomaly, e.g. a pinched hose.

A still further object of the present disclosure is to provide an apparatus for applying a coating medium to an object, which apparatus solves one, several or all the foregoing objects.

A still further object of the present disclosure is to provide a calibration system solving one, several or all the foregoing objects.

A still further object of the present disclosure is to provide an industrial robot solving one, several or all the foregoing objects.

A still further object of the present disclosure is to provide a method of determining clogging characteristics of an apparatus for applying a coating medium to an object, which method solves one, several or all the foregoing objects.

According to one aspect, there is provided a method of determining a degree of clogging of discharge holes of an apparatus for applying a coating medium to an object, the method comprising conducting air through the discharge holes; determining an output air pressure between an air flow regulator of the apparatus and the discharge holes, the air flow regulator being arranged to regulate a flow of the air; and determining a degree of clogging of the discharge holes based on the output air pressure.

The method is based on the realization that a degree of clogging of the discharge holes can be determined based on the output air pressure. The method enables a reduction or elimination of waste of coating medium due to anomalous spray patterns arising out of clogged discharge holes. Furthermore, the method enables low levels of clogging to be accurately detected. The method also reduces false positive warnings that is a problem with the solution above, i.e. based on curves describing a relationship between shaping air flow and required output air pressure to achieve that flow. Furthermore, the method enables a reduced use of solvent for cleaning the apparatus and a reduced need for manual inspection. Thus, the method is cost-effective.

The method may be carried out continuously or at selected intervals during operation of the apparatus. An operator can thereby be informed of the degree of clogging. If the degree of clogging exceeds a certain value, a warning may be issued and/or an automatic cleaning process may be initiated.

The method may for example comprise determining the degree of clogging of the discharge holes based on an output air pressure difference needed to maintain a given air flow. In this case, the output air pressure difference may be determined by subtracting a previous output air pressure with zero clogging from a current output air pressure for the given air flow (with a certain degree of clogging). The method may thus comprise determining the degree of clogging based on a difference between the determined output air pressure and a target output air pressure (with zero clogging).

The air flow regulator may be arranged to maintain a constant air flow, e.g. by means of a regulation loop. The discharge holes may be provided in a shaping air ring of the apparatus. The air conducted through the discharge holes may thus be shaping air for atomizing the coating medium. The method may further comprise conducting the coating medium through a coating medium outlet of the apparatus, e.g. in a rotating deflecting element.

The apparatus may comprise a bell atomizer having a rotatable bell cup and the discharge holes may be shaping air nozzles provided in a shaping air ring of the bell atomizer. Although the present disclosure mainly describes the apparatus as comprising bell atomizer, the method is also applicable on other types of apparatuses for applying a coating medium to an object by means of shaping air, such as an apparatus comprising a paint gun operating with shaping air.

Throughout the present disclosure, an apparatus for applying a coating medium to an object may alternatively be referred to as a coating medium apparatus. The coating medium may for example be paint or varnish.

The method may further comprise determining the degree of clogging based on flow data indicative of the flow. The flow data may for example be a target flow or a measured flow of the conducted air.

The method may further comprise measuring the flow between the air flow regulator and the discharge holes and determining the flow data based on the measured flow. In this case, an actual or measured flow is thus used as the flow data.

The output air pressure may be determined by means of an output air pressure sensor. The output air pressure sensor may be arranged fluidly between the air flow regulator and the discharge holes, e.g. on an output air channel upstream of a branching point where the output air channel branches to the discharge holes.

The degree of clogging may be determined as a percentage of clogging. The percentage of clogging may be determined using an equation and/or machine learning.

The degree of clogging may be determined independently of an input air pressure of the air upstream of the air flow regulator. The input air pressure may alternatively be referred to as a supply pressure. The output air pressure may alternatively be referred to as an internal pressure.

The degree of clogging may be determined based on an equation. The equation may constitute a model of the apparatus. The equation may be a first order equation.

The equation may comprise a scaling factor dependent on the flow. Alternatively, or in addition, the equation may comprise an offset term dependent on the flow. The only variables of the equation may be the flow and the determined output air pressure.

The method may further comprise filtering out false positives. For example, the output air pressure may be monitored over time and temporal restrictions of the shaping air flow may be classified as hose pinching, while a gradual restriction buildup over time may be classified as clogging of the discharge holes.

According to a further aspect, there is provided an apparatus for applying a coating medium to an object, wherein the apparatus is configured to carry out the method according to the present disclosure.

According to a further aspect, there is provided an apparatus for applying a coating medium to an object, the apparatus comprising a plurality of discharge holes for air; an air flow regulator arranged to regulate a flow of the air to the discharge holes; and an output air pressure sensor arranged fluidly between the air flow regulator and the discharge holes and arranged to determine an output air pressure.

The apparatus may further comprise a control system configured to determine a degree of clogging of the discharge holes based on the output air pressure determined by the output air pressure sensor. The control system may further be configured to determine the degree of clogging based on flow data indicative of the flow. The apparatus may further comprise an air flow sensor arranged fluidly between the air flow regulator and the discharge holes and arranged to measure the flow between the air flow regulator and the discharge holes. The flow data may then be determined based on the measured flow.

According to a further aspect, there is provided a control system for determining a degree of clogging of discharge holes of an apparatus for applying a coating medium to an object, the control unit comprising a data processing device and a memory having a computer program stored thereon, the computer program comprising program code which, when executed by the data processing device, causes the data processing device to perform the steps of receiving a pressure signal indicative of an output air pressure of air conducted through the discharge holes at a point fluidly between an air flow regulator of the apparatus and the discharge holes, the air flow regulator being arranged to regulate the flow of the air; and determining a degree of clogging of the discharge holes based on the output air pressure.

The apparatus may comprise an atomizer having a rotatable deflecting element downstream of the discharge holes, such as a bell atomizer comprising a rotatable bell cup.

According to a further aspect, there is provided a calibration system comprising an apparatus according to the present disclosure and a blocking device configured to block at least one of the discharge holes when being attached to the apparatus, and configured to be detached from the apparatus. The calibration system may comprise a plurality of blocking devices, each for simulating blocking of a unique number of discharge holes. Alternatively, a single reconfigurable blocking device may be used to block different numbers of discharge holes.

According to a further aspect, there is provided an industrial robot comprising an apparatus according to the present disclosure or a calibration system according to the present disclosure.

According to a further aspect, there is provided a method of determining clogging characteristics of an apparatus for applying a coating medium to an object, the method comprising conducting air through discharge holes of the apparatus with a first parameter setting, the first parameter setting comprising flow data indicative of a flow of the air, and clogging data indicative of a degree of clogging of the discharge holes; determining a first output air pressure between an air flow regulator of the apparatus and the discharge holes for the first parameter setting, the air flow regulator being arranged to regulate the flow; conducting air through the discharge holes with a second parameter setting where at least one of the flow data and the clogging data is different from the first parameter setting; determining a second output air pressure between the air flow regulator and the discharge holes for the second parameter setting; and determining a relationship between a degree of clogging of the discharge holes and the output air pressure based on the flow data of the first and second parameter settings, the clogging data of the first and second parameter settings, the first output air pressure and the second output air pressure.

By means of the method according to this aspect, the apparatus can be calibrated in terms of clogging characteristics. The flow data may be changed between the first parameter setting and the second parameter setting by means of the air flow regulator. The clogging data may be changed between the first parameter setting and the second parameter setting by means of a blocking device according to the present disclosure or by means of temporarily adhering tape over one or more discharge holes.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
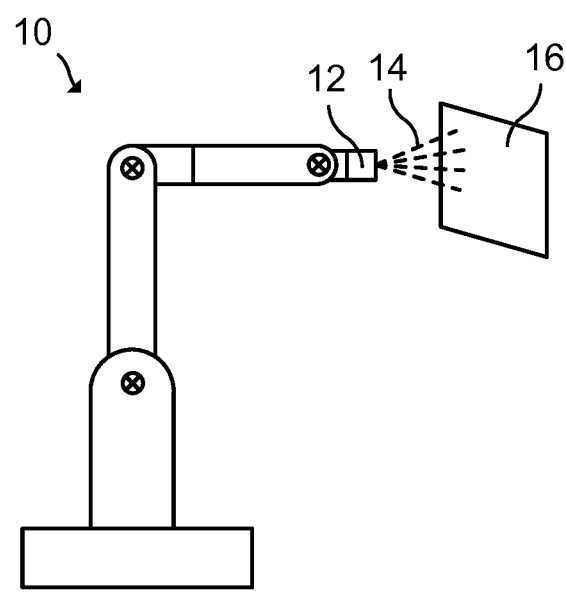
FIG. 1: schematically represents a side view of an industrial robot comprising an apparatus for applying a coating medium to an object.

In the following, a method of determining a degree of clogging of discharge holes of an apparatus for applying a coating medium to an object, an apparatus for applying a coating medium to an object, a calibration system comprising the apparatus and a blocking device, an industrial robot comprising the apparatus, and a method of determining clogging characteristics of an apparatus for applying a coating medium to an object, will be described. The same or similar reference numerals will be used to denote the same or similar structural features.

FIG. 1 schematically represents a side view of an industrial robot 10 comprising an apparatus 12 for applying a coating medium 14 to an object 16. The coating medium 14 may for example be paint and the object 16 may for example be a motor vehicle body part. The robot 10 comprises a manipulator programmable in three or more axes.

Figure 2:
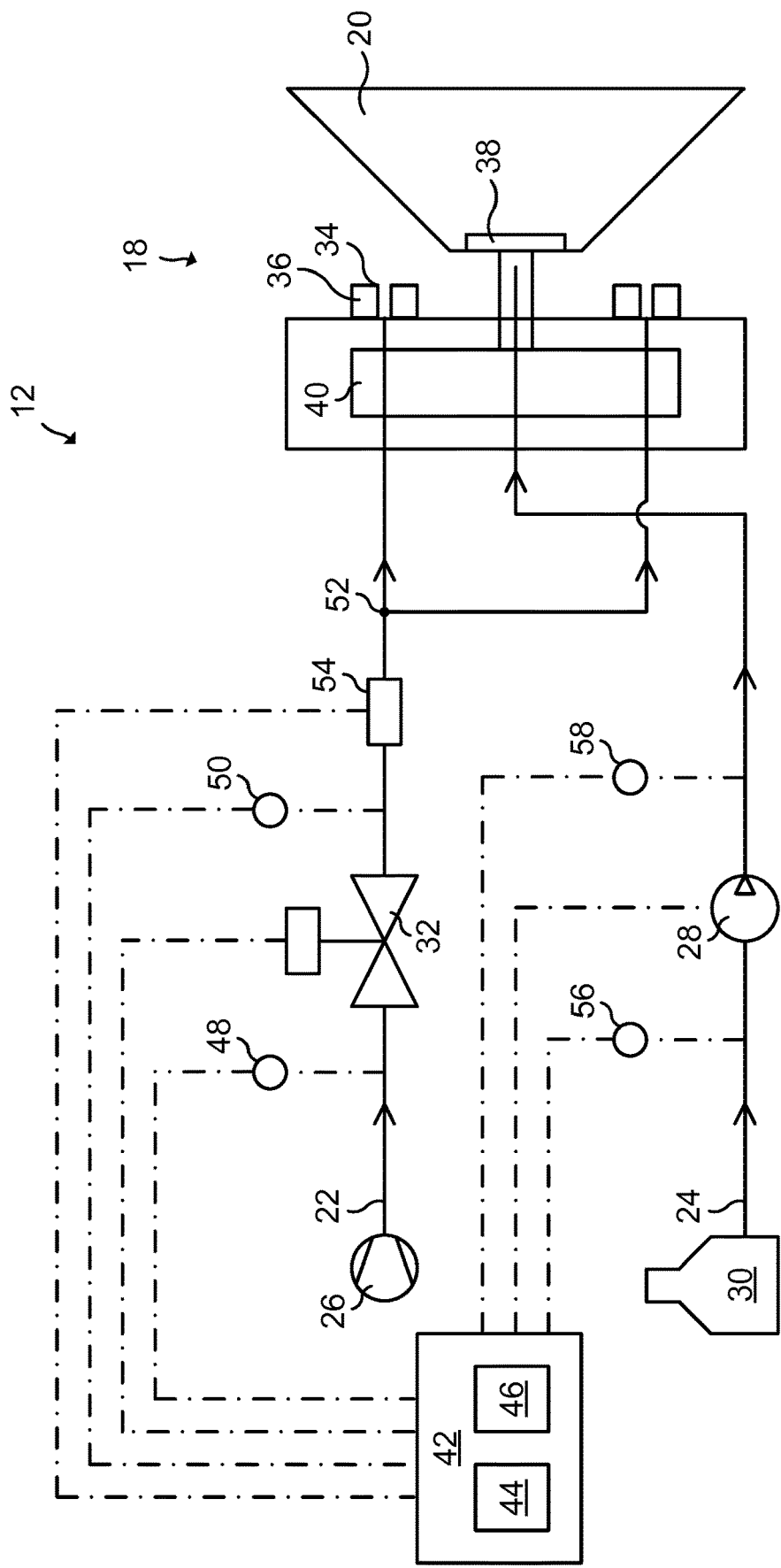
FIG. 2: schematically represents a side view of the apparatus.
Figure 3:
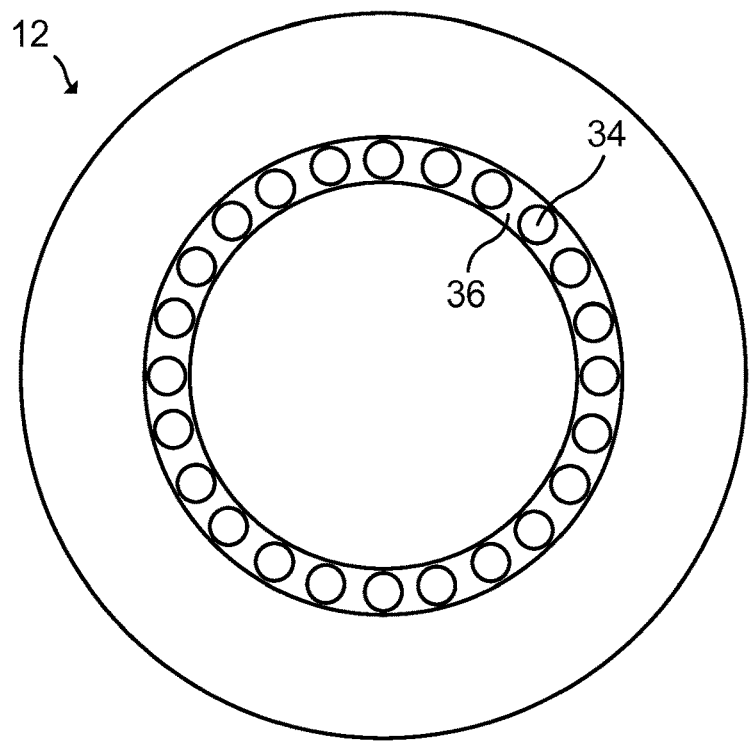
FIG. 3: schematically represents a partial front view of the apparatus.
Figure 4:
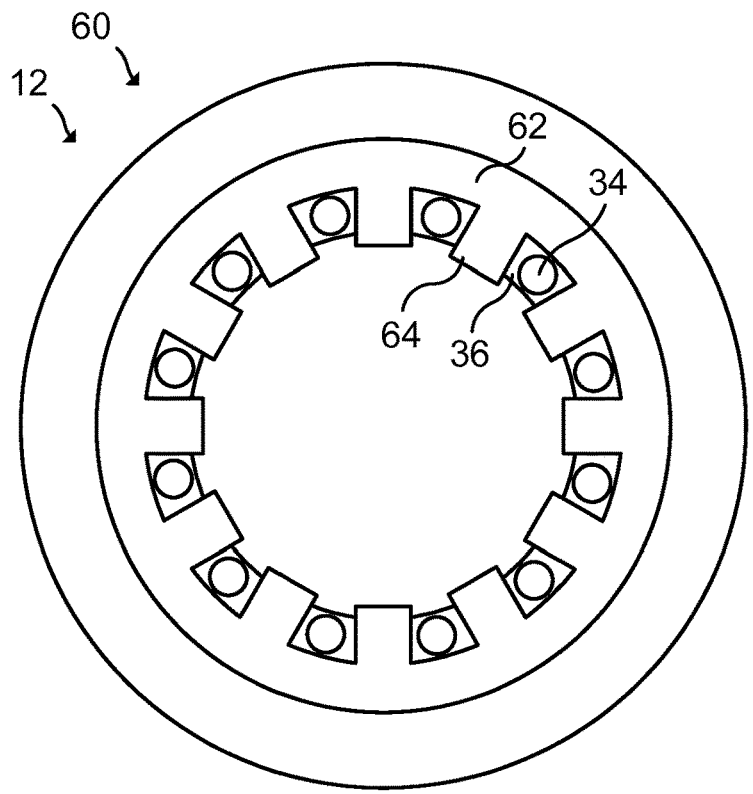
FIG. 4: schematically represents a calibration system comprising the apparatus and a blocking device.

FIG. 2 schematically represents a cross-sectional side view of the apparatus 12. The apparatus 12 is here exemplified as comprising a bell atomizer 18. The bell atomizer 18 comprises a rotatable deflecting element in the form of a bell cup 20.

The apparatus 12 comprises a flexible air hose 22 and a flexible coating medium hose 24. Pressurized air is led from a compressor 26 to the apparatus 12 through the air hose 22.

The apparatus 12 further comprises a pump 28. The pump 28 receives pressurized coating medium from a reservoir 30 to the apparatus 12 through the coating medium hose 24. In the example in FIG. 2, the compressor 26 and the reservoir 30 are arranged outside the apparatus 12. The compressor 26 may provide pressurized air to several robots 10. Thus, the available pressure from the compressor 26 is typically substantially higher than what is needed by the apparatus 12.

The apparatus 12 further comprises an air flow regulator 32. The air flow regulator 32 is arranged to regulate a flow of the air through the apparatus 12. To this end, the air flow regulator 32 may comprise a proportional valve and a motor for controlling the proportional valve. During application of coating medium, the air flow regulator 32 may be arranged to maintain a constant air flow, e.g. 200 Nl/min (normal liter per minute).

The apparatus 12 further comprises a plurality of discharge holes 34 for shaping air. The discharge holes 34 are distributed around a shaping air ring 36 of the apparatus 12. The apparatus 12 further comprises a coating medium outlet 38 for coating medium. The coating medium outlet 38 is centered in the bell cup 20.

The apparatus 12 further comprises a turbine 40. The turbine 40 is arranged to be rotated by a turbine air flow to rotate the bell cup 20. The turbine air flow may be a flow separate from the shaping air.

The bell atomizer 18 of this example comprises the turbine 40, the shaping air ring 36, the discharge holes 34 and the bell cup 20. The bell atomizer 18 is arranged at the distal end of the manipulator of the robot 10. The remaining parts of the apparatus 12 may be arranged in other sections of the robot 10 and/or outside the robot 10.

The apparatus 12 further comprises a control system 42. The control system 42 comprises a data processing device 44 and a memory 46 having a computer program stored thereon. The computer program comprises program code which, when executed by the data processing device 44, causes the data processing device 44 to perform various steps, or command performance of various steps, according to the present disclosure.

The apparatus 12 further comprises an input air pressure sensor 48 for measuring an input air pressure of the shaping air. The input air pressure sensor 48 is arranged upstream of the air flow regulator 32, between the compressor 26 and the air flow regulator 32. The input air pressure sensor 48 is in signal communication with the control system 42. The input air pressure measured by the input air pressure sensor 48 may be used to ensure a sufficient supply pressure to the air flow regulator 32.

The apparatus 12 further comprises an output air pressure sensor 50 for measuring an output air pressure of the shaping air. The output air pressure sensor 50 is arranged downstream of the air flow regulator 32, between the air flow regulator 32 and the discharge holes 34. As shown in FIG. 2, the output air pressure sensor 50 is arranged on an output air channel upstream of a branching point 52 where the output air channel branches to the discharge holes 34. The output air pressure sensor 50 is in signal communication with the control system 42.

The apparatus 12 further comprises an air flow sensor 54 for measuring the flow of the shaping air. The air flow sensor 54 is arranged downstream of the air flow regulator 32, between the air flow regulator 32 and the discharge holes 34. As shown in FIG. 2, also the air flow regulator 32 is arranged on the output air channel upstream of the branching point 52. The air flow sensor 54 is in signal communication with the control system 42.

In the example in FIG. 2, the output air pressure sensor 50 is arranged between the air flow regulator 32 and the air flow sensor 54. As an alternative, the air flow sensor 54 may be arranged between the air flow regulator 32 and the output air pressure sensor 50.

The apparatus 12 further comprises an input coating medium pressure sensor 56 for measuring an input coating medium pressure. The input coating medium pressure sensor 56 is arranged upstream of the pump 28, between the reservoir 30 and the pump 28. The input coating medium pressure sensor 56 is in signal communication with the control system 42.

The apparatus 12 further comprises an output coating medium pressure sensor 58 for measuring an output coating medium pressure. The output coating medium pressure sensor 58 is arranged downstream of the pump 28, between the pump 28 and the coating medium outlet 38.

During operation of the apparatus 12, pressurized air from the compressor 26 is controlled by the air flow regulator 32 to form shaping air. The shaping air exits through the discharge holes 34. Rotation of the turbine 40 causes the bell cup 20 to rotate. The coating medium from the reservoir 30 is conveyed by the pump 28 to the coating medium outlet 38. Due to the rotation of the bell cup 20, the coating medium flows from the coating medium outlet 38 to the front edge of the rotating bell cup 20. The shaping air from the discharge holes 34 is deflected by the bell cup 20, forms a flow of atomizing air, and propels coating medium droplets forward into a mist. The coating medium is thereby atomized.

During operation of the apparatus 12 of this example, the control system 42 reads sensor values from the input air pressure sensor 48, the output air pressure sensor 50, the air flow sensor 54, the output coating medium pressure sensor 58 and the input coating medium pressure sensor 56, and controls the air flow regulator 32 and the pump 28. The shaping air flow is controlled by controlling the air flow regulator 32 based on flow data from the air flow sensor 54.

Coating medium and other particles may access the discharge holes 34 over time and partially block or clog the discharge holes 34. This will manifest as an uneven flow of coating medium from the apparatus 12 since the shaping air is no longer supplied uniformly through the discharge holes 34.

A method of determining a degree of clogging of the discharge holes 34 may be carried out continuously during operation of the apparatus 12, or at selected intervals. Even when there is no clogging of the discharge holes 34, the discharge holes 34 restrict the shaping air therethrough. The output air pressure sensor 50 and the air flow sensor 54 are used to measure characteristics of the shaping air. In order to determine a degree of clogging of the discharge holes 34, the output air pressure is read by the output air pressure sensor 50 and the air flow is read by the air flow sensor 54. The degree of clogging is then determined based on the values from the output air pressure sensor 50 and the air flow sensor 54, e.g. by means of an equation.

As an alternative to the flow data measured by the air flow sensor 54, a commanded flow may be used as the flow data. As a further alternative, the method may be carried out with a constant air flow, or with an assumed constant air flow.

It has been realized that there is a correlation between the degree of clogging of the discharge holes 34, the output air pressure between the air flow regulator 32 and the discharge holes 34, and the air flow between the air flow regulator 32 and the discharge holes 34. For example, in some implementations, the output air pressure increases linearly from 0% to 30% blocking of the discharge holes 34 with an air flow of 200 Nl/min.

When the degree of clogging of the discharge holes 34 is increased, the output air pressure increases but there is no significant rise in the input air pressure. Since the input air pressure does not substantially affect the output air pressure due to the control of the air flow regulator 32, a model of the apparatus 12 can be defined with the following first order equation:

$$B = \frac{P}{k(F)} - \frac{b(F)}{k(F)} \quad (1)$$

where B is the blocking percentage of the discharge holes 34, P (bar) is the output air pressure, k(F) is a scaling factor and b(F) is an offset term.

The scaling factor k(F) can be defined as:

$$k(F)=k_{scale}*F+k_{bias} \quad (2)$$

where F is the flow (Nl/min) and $k_{scale}$ and $k_{bias}$ are constants. There is thus a linear relationship between the air flow and the scaling factor. The constants $k_{scale}$ and $k_{bias}$ can be extracted from tests on the apparatus 12, e.g. with various simulated clogging levels of the discharge holes 34.

The offset term b(F) can be defined as:

$$b(F)=b_{scale}*F+b_{bias} \quad (3)$$

where $b_{scale}$ and $b_{bias}$ are constants. There is thus a linear relationship between the air flow and the offset term. The constants $b_{scale}$ and $b_{bias}$ can be extracted from tests on the apparatus 12, e.g. with various simulated clogging levels of the discharge holes 34.

Thus, equation (1) for determining the degree of clogging is only dependent on the flow data and the output air pressure. For constant air flows, equation (1) is only dependent on the output air pressure. Equation (1) is for example not dependent on the input air pressure. When the flow increases, both the scaling factor k(F) and the offset term b(F) of equation (1) increase.

In some implementations, the air hose 22 may be temporarily pinched by certain movements of the robot 10. This results in a temporal, additional restriction of the shaping air flow causing the air flow to be reduced, unless the control system 42 can compensate with a higher output air pressure. As soon as the robot 10 moves away from the position causing the air hose 22 to be pinched, the normal (unpinched) condition is restored. On the other hand, clogging of the discharge holes 34 builds up over time, and does not come and go as the pinching of the air hose 22. For this reason, temporal restrictions of the shaping air flow may be classified as hose pinching, while a gradual restriction buildup over time may be classified as clogging of the discharge holes 34.

FIG. 3 schematically represents a partial front view of the apparatus 12. FIG. 4 schematically represents a calibration system 60 comprising the apparatus 12 and a blocking device 62. In FIGS. 3 and 4, the bell cup 20 is removed to improve visibility. The blocking device 62 is configured to selectively block a plurality of the discharge holes 34. The blocking device 62 is here exemplified as an adapter detachably attached onto the shaping air ring 36. The blocking device 62 comprises a plurality of restrictor plates 64. The blocking device 62 may for example be produced by means of additive manufacturing, such as 3D printing.

As illustrated in FIG. 4, the restrictor plates 64 block a plurality of discharge holes 34. By blocking a plurality of discharge holes 34 by means of the blocking device 62, clogging of the discharge holes 34 can be simulated.

The characteristics of the clogging degree, the output air pressure and the flow will be different for each implementation. By simulating different clogging levels of the discharge holes 34 with the blocking device 62 (and optionally a zero-clogging level without the blocking device 62) for a constant air flow, a corresponding change in output air pressure can be detected. Conversely, by simulating different clogging levels of the discharge holes 34 with the blocking device 62 (and optionally a zero-clogging level without the blocking device 62) for a constant output air pressure, a corresponding change in flow through the air flow regulator 32 can be detected. In this way, the apparatus 12 can be calibrated, i.e. the clogging characteristics can be determined. For each flow, the output air pressure can be plotted as a function of the clogging degree. The data can then be interpolated to extract equation (1) above.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of determining a degree of clogging of discharge holes of an apparatus for applying a coating medium to an object, the method comprising:
    conducting shaping air through the discharge holes;
    determining an output air pressure between an air flow regulator of the apparatus and the discharge holes, the air flow regulator being arranged to regulate a flow of the air; and
    determining a degree of clogging of the discharge holes based on the output air pressure.

2. The method according to claim 1, further comprising determining the degree of clogging based on flow data indicative of the flow.

3. The method according to claim 2, further comprising measuring the flow between the air flow regulator and the discharge holes and determining the flow data based on the measured flow.

4. The method according to claim 1, wherein the output air pressure is determined by means of an output air pressure sensor.

5. The method according to claim 1, wherein the degree of clogging is determined as a percentage of clogging.

6. The method according to claim 1, wherein the degree of clogging is determined independently of an input air pressure of the air upstream of the air flow regulator.

7. The method according to claim 1, wherein the degree of clogging is determined based on an equation.

8. The method according to claim 7, wherein the equation comprises a scaling factor dependent on the flow.

9. The method according to claim 7, wherein the equation comprises an offset term dependent on the flow.

10. An apparatus for applying a coating medium to an object, wherein the apparatus is configured to carry out a method including the following steps:
    conducting shaping air through a plurality of discharge holes;
    determining an output air pressure between an air flow regulator of the apparatus and the discharge holes, the air flow regulator being arranged to regulate a flow of the air; and
    determining a degree of clogging of the discharge holes based on the output air pressure.

11. An apparatus for applying a coating medium to an object, comprising:
    a plurality of discharge holes for shaping air;
    an air flow regulator arranged to regulate a flow of the air to the discharge holes;
    an output air pressure sensor arranged fluidly between the air flow regulator and the discharge holes and arranged to determine an output air pressure;
    an atomizer having a rotatable deflecting element downstream of the discharge holes; and
    a control system configured to determine a degree of clogging of the discharge holes based on the output air pressure determined by the output air pressure sensor.

12. The apparatus according to claim 11, wherein the control system is further configured to determine the degree of clogging based on flow data indicative of the flow.

13. A calibration system comprising:
    an apparatus configured to carry out a method including the following steps:
        conducting air through a plurality of discharge holes;
        determining an output air pressure between an air flow regulator of the apparatus and the discharge holes, the air flow regulator being arranged to regulate a flow of the air; and
        determining a degree of clogging of the discharge holes based on the output air pressure; and
    a blocking device configured to block at least one of the discharge holes when being attached to the apparatus, and configured to be detached from the apparatus.

14. An industrial robot comprising:
    an apparatus for applying a coating medium to an object, wherein the apparatus is configured to carry out the method including the following steps:
        conducting shaping air through a plurality of discharge holes;
        determining an output air pressure between an air flow regulator of the apparatus and the discharge holes, the air flow regulator being arranged to regulate a flow of the air; and
        determining a degree of clogging of the discharge holes based on the output air pressure.

15. A method of determining clogging characteristics of an apparatus for applying a coating medium to an object, the method comprising:
    conducting air through discharge holes of the apparatus with a first parameter setting, the first parameter setting including flow data indicative of a flow of the air, and clogging data indicative of a degree of clogging of the discharge holes;
    determining a first output air pressure between an air flow regulator of the apparatus and the discharge holes for the first parameter setting, the air flow regulator being arranged to regulate the flow;
    conducting air through the discharge holes with a second parameter setting where at least one of the flow data and the clogging data is different from the first parameter setting;
    determining a second output air pressure between the air flow regulator and the discharge holes for the second parameter setting; and
    determining a relationship between a degree of clogging of the discharge holes and the output air pressure based on the flow data of the first and second parameter settings, the clogging data of the first and second parameter settings, the first output air pressure and the second output air pressure.

* * * * *